US007295845B2

(12) United States Patent
Larmala et al.

(10) Patent No.: US 7,295,845 B2
(45) Date of Patent: Nov. 13, 2007

(54) METHOD AND NODE FOR THE SET-UP OF A CONNECTION IN A TELECOMMUNICATION NETWORK

(75) Inventors: Pekka Larmala, Herzogenrath (DE); Leena Mattila, Kaarina (FI); Timo Suihko, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 185 days.

(21) Appl. No.: 10/493,677

(22) PCT Filed: Nov. 3, 2001

(86) PCT No.: PCT/EP01/12758

§ 371 (c)(1),
(2), (4) Date: Oct. 11, 2004

(87) PCT Pub. No.: WO03/041435

PCT Pub. Date: May 15, 2003

(65) Prior Publication Data

US 2005/0036517 A1    Feb. 17, 2005

(51) Int. Cl.
*H04Q 7/20* (2006.01)
*H04Q 7/00* (2006.01)
*H04B 1/38* (2006.01)
*H04M 1/00* (2006.01)
*H04J 3/06* (2006.01)

(52) U.S. Cl. .................... 455/453; 455/458; 455/456.5; 455/560; 370/503; 370/329; 370/518

(58) Field of Classification Search .............. 455/438, 455/435.1, 456.1, 502, 507, 528, 561, 67.11, 455/466, 453, 454, 455, 458, 456.5, 560, 455/522; 379/111; 370/503, 328, 329, 278, 370/313, 341, 516, 518, 519
See application file for complete search history.

(56) References Cited

U.S. PATENT DOCUMENTS 5,711,006 A    1/1998  Brochu
6,275,708 B1   8/2001  Lahtinen
6,321,093 B1 * 11/2001  Dalal ........................ 455/512

(Continued)

FOREIGN PATENT DOCUMENTS

WO    WO9213428     8/1992
WO    WO 0069184 A2  11/2000

OTHER PUBLICATIONS

3GPP TS 23.153 v4.3.0 (Sep. 2001) 3rd Generation Partnership Project; Technical Specification Group Core Network; Out of Band Transcoder Control - Stage 2: (Release 4).

(Continued)

*Primary Examiner*—Nay Maung
*Assistant Examiner*—Andrew Wendell
(74) *Attorney, Agent, or Firm*—Roger S. Burleigh

(57) ABSTRACT

In a method for the set-up of a connection in a communication network, the set-up is initiated with an initial message (12) from an originating control node (ON) to a terminating control node (TN) of the connection and the establishment of a bearer for the connection is initiated according to a reply to the initial message (12). A control timer (CT) is started according to the initial message (12) and an expiry of the control timer (CT) before an indication of the bearer establishment triggers a release for the connection. In the method, after receiving the initial message (12) at the terminating control node (TN), a paging (13) a user equipment (UE') for the connection and starting a first timer (FT) according to the paging (13) initiation is performed, the expiry value of the first timer (FT) being set lower than the expiry value of the control timer (CT). The bearer establishment for the connection is initiated upon expiry of the first timer (FT) and the control timer (CT) is stopped upon reception of an indication of the bearer establishment. Devices and software programs embodying the invention are also described.

11 Claims, 1 Drawing Sheet

U.S. PATENT DOCUMENTS

| | | | | |
|---|---|---|---|---|
| 6,349,206 | B1* | 2/2002 | Reichelt et al. | 455/421 |
| 6,618,375 | B2* | 9/2003 | Rezaiifar et al. | 370/394 |
| 2001/0031634 | A1* | 10/2001 | Mizutani et al. | 455/425 |
| 2002/0009995 | A1* | 1/2002 | Fujii | 455/435 |
| 2002/0160812 | A1* | 10/2002 | Moshiri-Tafreshi et al. | 455/561 |
| 2004/0121769 | A1* | 6/2004 | Aoki et al. | 455/435.1 |
| 2004/0170196 | A1* | 9/2004 | Susnow | 370/503 |

OTHER PUBLICATIONS

3GPP TS 23.205 V4.2.0 (Sep. 2001) 3rd Generation Partnership Project; Technical Specification Group Core Network; Bearer-independent circuit-switched core network; Stage 2 (Release 4).

ITU-T Q-1902-1 (Jul. 2001) Bearer Independent Call Control protocol (capability Set 2) Function description.

ITU-T Q-1902-2 (Jul. 2001) Bearer Independent Call Control protocol (Capability Set 2) and Signalling System No. 7 ISDN User Part: General functions of messages and parameters.

ITU-T Q-1902-3 (Jul. 2001) Bearer Independent Call Control protocol (Capability Set 2) and Signalling System No. 7 ISDN User Part Formats and codes.

ITU-T Q-1902-4 Bearer Independent Call Control protocol (Capability Set 2) and Signalling System No. 7 ISDN User Part Formats and codes (Jul. 2001).

ITU-T Q-1902-5 (Jul. 2001) Bearer Independent Call Control protocol (Capability Set 2) Exceptions to the application transport mechanism in the context of BICC.

ITU-T Q-1902-6 (Jul. 2001) Bearer Independent Call Control protocol (Capability Set 2) Generic signalling procedures for the support of the ISDN user part supplementary services and for bearer redirection.

* cited by examiner

State of the art

METHOD AND NODE FOR THE SET-UP OF A CONNECTION IN A TELECOMMUNICATION NETWORK

TECHNICAL FIELD OF THE INVENTION

The present invention relates to method and apparatus for setting up a bearer connection in a telecommunications network.

BACKGROUND OF THE INVENTION

In a communication network, the set-up of a connection is generally initiated with an initial message from an originating control node to a terminating control node of the connection, e.g. with an initial address message (IAM) as defined by ITU (International Telecommunication Union) and 3GPP (3$^{rd}$ Generation Partnership Project) specifications. The originating control node, for example a fixed telephony exchange or an MSC (Mobile Services Switching Center), receives a request for establishment of the connection from an originating user, e.g. via a radio access network or a fixed telephone line. The terminating control node controls the final section of the connection to the terminating user equipment. It is possible that the terminating control node is the originating control node. One or more transit control nodes may forward and process messages between the originating and the terminating control node.

In bearer independent networks, a connection control signaling can be performed between the originating and the terminating control node as well as between the originating and the terminating user equipment before the bearer establishment is initiated. This is for instance advantageous for a speech call if the transmission is optimized with out of band transcoder control in which the used codec is negotiated before a transmission bearer for the selected codec is established. If the routing of the control signaling and the bearer routing are performed over different nodes, it is beneficial to delay the selection of the bearer nodes and especially of the terminating bearer node, e.g. an MGW (Media Gateway), as well as the bearer establishment until the exact location of the terminating user is known and a signaling connection to the user equipment is established. By delaying the bearer establishment until the signaling is performed between originating and terminating control node as well as the terminating user equipment, the usage of the network resources and the transmission path can be optimized.

The establishment of a bearer for the connection is therefore preferably initiated by the originating control node according to a bearer information message in reply to the initial message. The bearer information message can especially indicate a terminating bearer node for the connection and transmission parameters like a selected speech codec. A continuity message indicating the establishment of the bearer is then sent from the originating to the terminating control node. The initial message can therefore indicate whether a continuity message will follow, i.e. whether the bearer establishment will be initiated later, or whether a bearer is already established. To avoid the blocking of resources in case that a later connection establishment fails, a control timer is started in every node controlling the connection according to the initial message. If the control timer expires before the continuity message with the indication of the bearer establishment is received, the control node triggers a release of the connection. An allowed range of settings is specified for the control timer in telecommunication networks.

Especially if the control messages are sent over transit nodes, several control timers may be started. The transit nodes can either be located in fixed or in mobile networks which have widely differing requirements for the setting of the control timer. In fixed networks with a known position of the terminating user, the times for connection set-up vary in a comparatively narrow range. In mobile networks, a paging procedure of the user equipment is part of the signaling and must be completed before full bearer establishment to the user equipment. The time for paging can vary in a wide interval. Especially if a global paging has to be performed because the present position of the user is unknown, e.g. due to a failure of a location register, the paging may need a long time. Although the above procedure is sufficient in many cases, the control timer can therefore expire before the paging response is received. In this case the connection is released and the terminating user cannot be reached.

SUMMARY AND DESCRIPTION OF THE INVENTION

It is an object of the present invention to obviate the above disadvantages and provide a method which allows to set up a connection to a mobile user independent of the setting of the control timer.

In the proposed method, the set-up of a connection is initiated with an initial message from an originating control node to a terminating control node of the connection. The establishment of a bearer for the connection is delayed and initiated according to a reply to the initial message, e.g. a message indicating a paging response. A control timer is started according to the initial message and an expiry of the control timer before an indication of the bearer establishment triggers a release of the connection. The indication can be for example a continuity message as described above or an indication from a node establishing the bearer, either an internal indication if the control node performs the establishment or a message from a bearer node performing the bearer establishment.

After receiving the initial message at the terminating control node, a paging of a user equipment for the connection is performed and a first timer is started according to the initiation of the paging. The expiry value of the first timer is set lower than the expiry value of the control timer and the bearer establishment for the connection is initiated upon expiry of the first timer. The control timer is stopped upon reception of an indication of the bearer establishment. The initiation and indication of the bearer establishment can be performed stepwise for different sections of the bearer under control of a respective control node.

While the proposed method is also applicable for a backward bearer establishment which is delayed until a paging response, it is especially useful for forward bearer establishment from the originating to the terminating control node. In this case, again the terminating control node receives an initial message requesting the set-up of a connection. In response to the initial message, the terminating control node initiates the paging of the terminating user equipment for the connection. Furthermore, a first timer is started in the terminating control node. The first timer is set to expire before the expiry of a control timer started for the connection, the control timer triggering a release of the connection if no bearer establishment is confirmed before expiry. If the specifications for control nodes allow a range of settings for the control timer, the expiry value for the first timer is preferably set lower than the lower limit of the allowed range for the control timer. In this way, the first timer always expires before any control timer, regardless of the involved control nodes and settings of the control timer. The difference between the lower limit for the control timer and the setting of the first timer is preferably at least the maximum delay of the initial message and the bearer information message between originating and terminating control node plus a value considering the time required for the bearer establishment.

Upon expiry of the first timer, the terminating control node sends a bearer information message to the originating control node. The originating control node initiates the bearer establishment for the connection upon reception of the bearer information message. After having received a confirmation of the bearer establishment towards the originating user equipment, the originating control node sends a continuity message towards the terminating control node. Any control node which has a running control timer stops it upon reception of the continuity message. In this way, a release of the connection due to a long paging is avoided. Typically, the bearer is established stepwise in sections between different nodes handling the payload or between different entities within a node and the establishment of each bearer section is confirmed to a control node.

When a paging response is received before expiry of the first timer, the bearer establishment is triggered immediately by sending a bearer information message to the originating control node. If the paging response is received after the bearer information message, a further reply to the initial message is not required and not sent because the bearer establishment is already initiated. A bearer release is preferably performed immediately after detecting that no paging reply is received, for example when the bearer establishment reaches a node in which no destination for the payload bearer can be determined or when a message indicating a failed paging is received.

The invention provides a robust network solution considering both regular and exceptional mobile terminating call cases. Therefore, the optimized resource selection enabled by a bearer establishment from the originating control node is performed in the majority of cases while a secure establishment of mobile connections can be ensured.

While the proposed invention is also applicable if there are only one or two control nodes in a connection, it is especially advantageous in the case of transit control nodes which may be operated in an intermediate network of another operator and for which the setting of the control timer can generally not be influenced. In a preferred embodiment, at least one further, i.e. transit, control node handles therefore messages between the originating control node and the terminating control node. A further or transit control node can be any node in which a control timer may be started according to the processing of the initial message. It is especially beneficial that adaptations in transit control nodes are not required.

A control node can be for example a mobile services switching center or a transit switching center according to GSM or UMTS specifications.

A control timer can be located in any node from a group comprising the originating control node, the terminating control node and transit control nodes handling the initial message between the originating control node and the terminating control node. Especially for long distance connections, several control timers are possible.

In an embodiment, different types of paging are performed in the terminating control node and the first timer is started only for one or more predefined types of paging. Typically, the paging response of a user equipment is received for a paging in a specific location area before the expiry of any control timer unless a connection is impossible, e.g. due to bad transmission conditions. For certain paging types like a global paging within an MSC area, a successful connection establishment is, however, possible even after a long paging time. It can therefore be advantageous to start the first timer only for a special paging type, e.g. global paging. If a global paging is performed after an unsuccessful regular paging like in customary GSM systems, the time for the regular paging has to be considered in the setting of the first timer and the first timer is in this case preferably started for any paging.

To avoid a blocking of resources by an unsuccessful attempt to establish a connection, a release timer is preferably started in the terminating control node upon the paging initiation or reception of the initial message. The expiry value of the release timer is set to a later time than the expiry value of the control timer. An advantageous expiry value of the release timer is the maximum time for which a reservation of connection resources is efficient for a connection attempt. A connection release is initiated by the terminating control node if no paging response is received from the user equipment until the expiry of the release timer, for example, by a release message sent to the originating control node for this purpose.

An advantageous communication network allows to perform the proposed method and is accordingly adapted, e.g. by control nodes comprising the first timer. The communication system can especially be or comprise a mobile network, for example a GSM network or a UMTS network.

The proposed method is applicable if the bearer is established through some or all control nodes in the connection, i.e. if control nodes perform also the bearer establishment. The method is, however, especially suitable if at least one bearer node, e.g. a media gateway, which is distinct from the control nodes performs the establishment of a bearer for the connection. The bearer is then established according to a message from a control node and the bearer node indicates this establishment to said control node in a notification message. In this way, the control signaling and the bearer establishment can be performed on different routes which allows a very efficient use of network resources. The proposed method allows to select network resources efficiently in this case without releasing connections prematurely due to delays in an access network.

The invention can especially be embodied in a terminating control node of a communication system, the term"terminating" merely denoting the control node in accordance with the above method. The terminating control node is provided with an interface for receiving and sending messages and a processing system for processing said messages. Especially, the terminating control node is adapted to receive an initial message from an originating control node. The initial message requests the set-up of a connection and the terminating control node is adapted to send a bearer information message in reply to the initial message, the bearer information message initiating the establishment of a bearer for the connection by the originating control node and/or transit control nodes. Upon reception of the initial message, the terminating control node initiates a paging of a user equipment for the connection, e.g. by a corresponding message.

The terminating control node according to the invention is provided with a first timer and the processing system is adapted to start the first timer according to the paging. The expiry value of the first timer is set to a predefined value which is selected to expire before the expiry of any control timer as described above and which is started for the connection. The terminating control node is adapted to send a bearer information message towards the originating control node upon expiry of the first timer. The bearer information message initiates the establishment of a bearer for the connection. If the bearer is already partly established between the originating control node and a transit control node, the bearer information message is only required to initiate the establishment of the remaining bearer sections. The proposed control node can especially perform any steps of the above method relating to the terminating control node.

A program unit according to the invention is for example stored on a data carrier or loadable into a control node of a communication system, e.g. as a sequence of signals. The program unit comprises code adapted for execution in a processing system of a control node. The control node is provided with an interface for receiving and sending messages and the processing system. Especially, the control node is adapted to receive an initial message from an originating control node for the set-up of a connection and to send a bearer information message in reply to the initial message for initiating the establishment of a bearer for the connection. Furthermore, the control node is adapted to initiate a paging of a user equipment for the connection. The program unit is adapted to determine the timing of the initial message or the paging when executed in the node.

The program unit comprises code adapted to start a first timer according to the paging, the expiry value of the first timer being set to a predefined value. The program unit comprises also code adapted to send a bearer information message towards the originating control node upon expiry of the first timer, the bearer information message initiating the establishment of a bearer for the connection. The program unit can be used in any of the above embodiments of the proposed method.

The foregoing and other objects, features and advantages of the present invention will become more apparent in the following detailed description of preferred embodiments as illustrated in the accompanying drawings.

DETAILED DESCRIPTION OF PREFERRED EMBODIMENTS OF THE INVENTION

Figure 1:
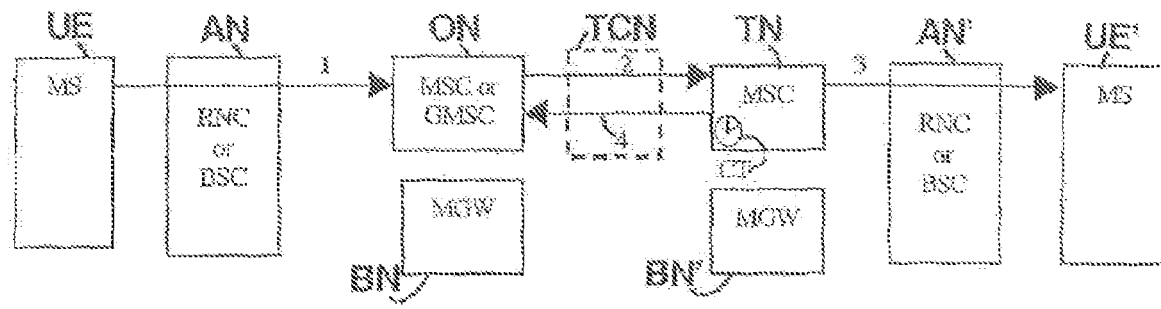
FIG. 1 shows a message flow for a connection between two users of a communication system in the state of the art
Figure 2:
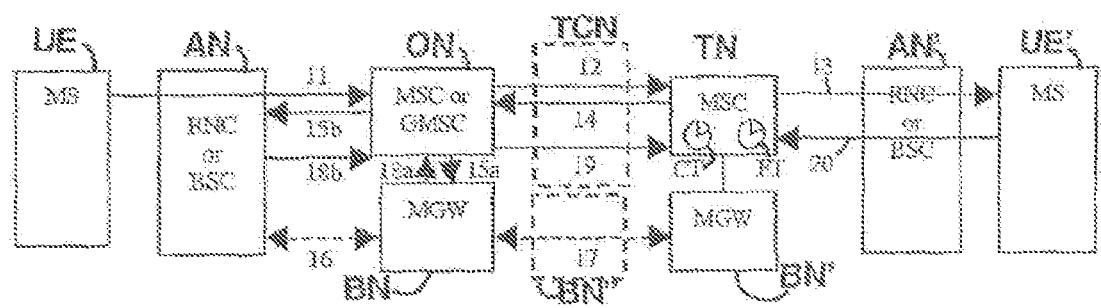
FIG. 2 shows a message flow for a connection between two users of a communication system according to the invention

FIGS. 1 and 2 show a message flow to set-up a call between an originating and a terminating user equipment UE, UE'. Although the examples depict a mobile originating connection it is obvious that a corresponding message flow applies also to a connection originating from a fixed network if the access node AN is replaced by a control node of the fixed network. In the examples, bearer node selections and bearer establishments are delayed until the connection control signaling is performed between the originating user equipment and the terminating control node or terminating user equipment.

In FIG. 1, the originating user equipment UE requests the set-up of the connection by a message 1 which is forwarded by the access node AN, e.g. an RNC (Radio Network Controller) or a BSC (Base Station Controller), to a control node ON, denoted originating control node. By an initial message 2, e.g. an Initial Address Message, the originating control node ON, e.g. an MSC or a GMSC (Gateway MSC), sends the connection request to a terminating control node TN, typically also an MSC. It is possible that one or more transit control nodes TCN forward and/or process the initial message 2 before it arrives at the terminating control node TN. When the terminating control node TN receives the initial message 2, a paging 3 of the terminating user equipment UE' is started via the terminating access node AN'.

Only call control signaling is performed during the initial message 2 while a bearer for the connection is not yet established, e.g. between the access node AN and the originating node ON. The bearer establishment is preferably initiated by the originating control node ON upon a bearer information message in reply to the initial message 2 by the terminating control node TN which is sent after a successful paging response because the connection can be established most resource-efficient in this way. In this case, the initial message indicates that a continuity message will follow, the continuity message indicating that the bearer establishment to the originating user equipment UE was performed. A control timer CT, for example denoted timer T8 in the BICC (Bearer Independent Call Control) protocol, is started in the terminating control node TN. to supervise the reception of the continuity message after the initial message. Any transit control node TCN over which initial message 2 is sent may also start a control timer for the continuity message.

In more detail, generally the indication that a continuity message will follow is included in an initial address message if the previous bearer section up to the bearer node that the respective control node is controlling is not established when the initial address message is sent. The continuity message is then sent when said previous bearer section is established. For an originating control node a continuity message is therefore sent when the bearer between the access node and the bearer node that the originating control node is controlling is established, e.g. the radio access bearer (RAB) assignment is completed. For a transit node the continuity message is sent when the continuity message is received from the previous control node and an indication from the bearer node is received that bearer is established between the previous bearer node and the bearer node that transit control node is controlling.

In most terminating call cases this procedure is sufficient, i.e. a connection is successfully established. But if the paging 3 takes a long time, e.g. after a VLR (Visitor Location Register) restart when a global paging is needed, the control timer CT that supervises the reception of the continuity message can expire before the paging response is received. It is both possible that a control timer CT expires in the terminating control node TN or in any transit control node TCN. Upon the expiry of any control timer, a call release is initiated and a bearer establishment for the connection between the bearer nodes BN, BN' is not performed. Even if a paging response is received later, a connection to the terminating user equipment UE' cannot be established.

According to the invention a new timer, denoted first timer FT throughout this text, is introduced in the terminating control node TN to supervise the paging time. If the paging takes a long time, a bearer establishment is triggered by the expiry of the first timer FT before the paging response is received in order to prevent control timer CT from expiring. The premature connection establishment may not lead to optimized network resource usage for the respective connection but it will prevent it from failing. For most mobile terminating connections the optimized network resource usage is achieved since the paging response will normally be received before the expiry of the first timer FT. Therefore, an efficient use of resources is achieved on average.

FIG. 2 shows involved nodes and the message flow according to the proposed method. As in FIG. 1, the set-up of a connection is initiated by a request from an originating user equipment with a corresponding message 11 via access node AN, followed by an initial message 12 from the originating control node ON to the terminating control node TN and a paging 13 via access node AN'. Again, transit control nodes TCN may forward initial message 12. Since a bearer between originating control node ON and access node AN has not been established, the initial message 12 will indicate that a continuity message will follow. A control timer CT is started in the terminating control node TN, generally also in optional transit control nodes TCN, to supervise the reception of the continuity message and trigger a connection release upon expiry.

At the terminating control node TN, a first timer FT to supervise the paging delay is started according to the initiation of paging 13. If the first timer FT expires before a paging response is received from the user equipment UE', the terminating control node TN starts the bearer establishment procedure by sending a bearer information message 14 to the originating control node ON to prevent the expiry of the control timer that supervises the reception of continuity message in any of the transit nodes TCN as well as in the terminating node TN. Upon reception of the bearer information message 14, the originating control node sends messages 15a, 15b to a bearer node BN and the originating access node AN of the connection. The messages 15a, 15b which may be sent simultaneously request the bearer establishment between the bearer node BN and a terminating bearer node BN as well as the bearer establishment towards the user equipment UE. According to the messages 15a, 15b, bearer sections 16, 17 are established between the originating user equipment UE and the terminating bearer node BN'. It is possible that the connection comprises further bearer nodes BN" and further bearer sections, the establishment of which can be controlled by the originating, the terminating or any transit control node processing the initial message 12 as well as bearer information message 14.

After receiving confirmation 18b of the bearer establishment in reply to the message 15b, the originating control node ON sends a continuity message 19 to the next control node in the connection, either a transit control node TCN or the terminating control node TN, that the bearer has been established. The timer that supervises the reception of the continuity message 19 is stopped and a connection release is avoided.

At any time before or after the expiry of the first timer FT, a paging response 20 can be received from the terminating user equipment UE'. The paging response 20 is used in terminating control node to start a signaling connection to the user equipment UE'. If the first timer expires, the bearer establishment procedure is started by bearer information message 14 before the paging response 20 is received. When paging response 20 is then finally received the network bearers may already be established.

The bearers established according to bearer information message 14 can be different from the required or optimum configuration. For example, a further bearer node may be required in addition to or instead of the selected bearer node BN' towards an access node AN' which is still undetermined when bearer information message 14 is sent, e.g. if a global paging 13 was performed via a plurality of access nodes AN'. In this case, a bearer needs to be established to the further bearer node. Also if transcoder negotiation is performed, a transcoder modification may be initiated after paging response 20 and the bearer accordingly modified. In such cases further signaling may be required between control nodes.

The above embodiments admirably achieve the objects of the invention. However, it will be appreciated that departures can be made by those skilled in the art without departing from the scope of the invention which is limited only by the claims.

The invention claimed is:

1. Method for the set-up of a connection in a communication network, wherein the set-up is initiated with an initial message from an originating control node to a terminating control node of the connection and the establishment of a bearer for the connection is initiated according to a reply to the initial message, wherein a control timer is started according to the initial message and wherein an expiry of the control timer (CT) before an indication of the bearer establishment triggers a release of the connection, comprising the steps of:

receiving the initial message at the terminating control node, paging a user equipment for the connection and starting a first timer (FT) according to the paging initiation, the expiry value of the first timer (FT) being set lower than the expiry value of the control timer (CT), initiating the bearer establishment for the connection upon expiry of the first timer (FT), stopping the control timer (CT) upon reception of an indication of the bearer establishment.

2. Method according to claim 1, wherein the first timer (FT) is started in the terminating control node and a bearer information message is sent to the originating control node upon expiry of the first timer (FT), the establishment of the bearer for the connection is initiated by the originating control node upon reception of the bearer information message and a continuity message which indicates the establishment of the bearer is sent from the originating control node to the terminating control node upon reception of the indication of the bearer establishment by the originating control node and the control timer (CT) is stopped upon reception of the continuity message.

3. Method according to claim 1, wherein at least one further control node handles messages between the originating control node and the terminating control node.

4. Method according to claim 1, wherein a control node is a mobile services switching center or a transit switching center.

5. Method according to claim 1, wherein the control timer (CT) is located in at least one node from a group comprising the originating control node, the terminating control node and transit control nodes handling the initial message between the originating control node and the terminating control node.

6. Method according to claim 1, wherein the first timer (FT) is started for at least one predefined type of paging.

7. Method according to claim 1, wherein a release timer is started in the terminating control node upon reception of the initial message or upon the paging initiation, the expiry value of the release timer being later than the expiry value of the control timer (CT), and wherein a connection release is initiated by the terminating control node if no paging response is received from the user equipment until the expiry of the release timer.

8. Method according to claim 1, wherein the communication system comprises a mobile network.

9. Method according to claim 1, wherein a bearer node performs the establishment of a bearer for the connection according to a message from a control node and indicates the establishment of the bearer to the control node.

10. Terminating control node in a communication network, wherein a set-up of a connection is initiated with an initial message from an originating control node to the terminating control node of the connection and the establishment of a bearer for the connection is initiated according to a reply to the initial message, wherein a control timer (CT) is started according to the initial message (12) and wherein an expiry of the control timer (CT) before an indication of the bearer establishment triggers a release of the connection, the terminating control node being provided with an interface for receiving and sending messages and a processing system for processing the messages, wherein the terminating control node is adapted to receive the initial message from an originating control node for the set-up of the connection and to send the reply to the initial message for initiating the establishment of the bearer for the connection, wherein the terminating control node is adapted to initiate a paging of a user equipment for the connection, wherein the terminating control node comprising:
  a first timer (FT) and the processing system is adapted to start the first timer (FT) according to the paging, the expiry value of the first timer (FT) being set to a predefined value lower than the expiry value of the control timer (CT), and
  means for sending a bearer information message towards the originating control node upon expiry of the first timer, the bearer information message initiating the establishment of a bearer for the connection.

11. A computer-readable medium encoded with a computer program adapted to execution in a processing system of a terminating control node in a communication network, wherein a set-up of a connection is initiated with an initial message from an originating control node to the terminating control node of the connection and the establishment of a bearer for the connection is initiated according to a reply to the initial message, wherein a control timer (CT) is started according to the initial message and wherein an expiry of the control timer (CT) before an indication of the bearer establishment triggers a release of the connection, the terminating control node being provided with an interface for receiving and sending messages and the processing system, wherein the terminating control node is adapted to receive the initial message from the originating control node for the set-up of the connection and to send the reply to the initial message for initiating the establishment of the bearer for the connection, wherein the terminating control node is adapted to initiate a paging of a user equipment for the connection, wherein the program unit comprises code adapted to start a first timer (FT) according to the paging, the expiry value of the first timer (FT) being set to a predefined value lower than the expiry value of the control timer (CT), and the program unit comprises code adapted to send a bearer information message towards the originating control node upon expiry of the first timer, the bearer information message initiating the establishment of a bearer for the connection.

* * * * *

UNITED STATES PATENT AND TRADEMARK OFFICE
CERTIFICATE OF CORRECTION

PATENT NO. : 7,295,845 B2
APPLICATION NO. : 10/493677
DATED : November 13, 2007
INVENTOR(S) : Larmala et al.

It is certified that error appears in the above-identified patent and that said Letters Patent is hereby corrected as shown below:

On the Title Page, in Field (75), under "Inventors", in Column 1, Line 1, delete "Herzogenrath (DE)" and insert -- Espoo (FI) --, therefor.

In Column 7, Line 35, delete "BN" and insert -- BN' --, therefor.

Signed and Sealed this

Sixteenth Day of March, 2010

David J. Kappos
*Director of the United States Patent and Trademark Office*